J. H. PLUMMER.
SCROLL-SAWING MACHINE.
No. 7,725. Reissued June 5, 1877.
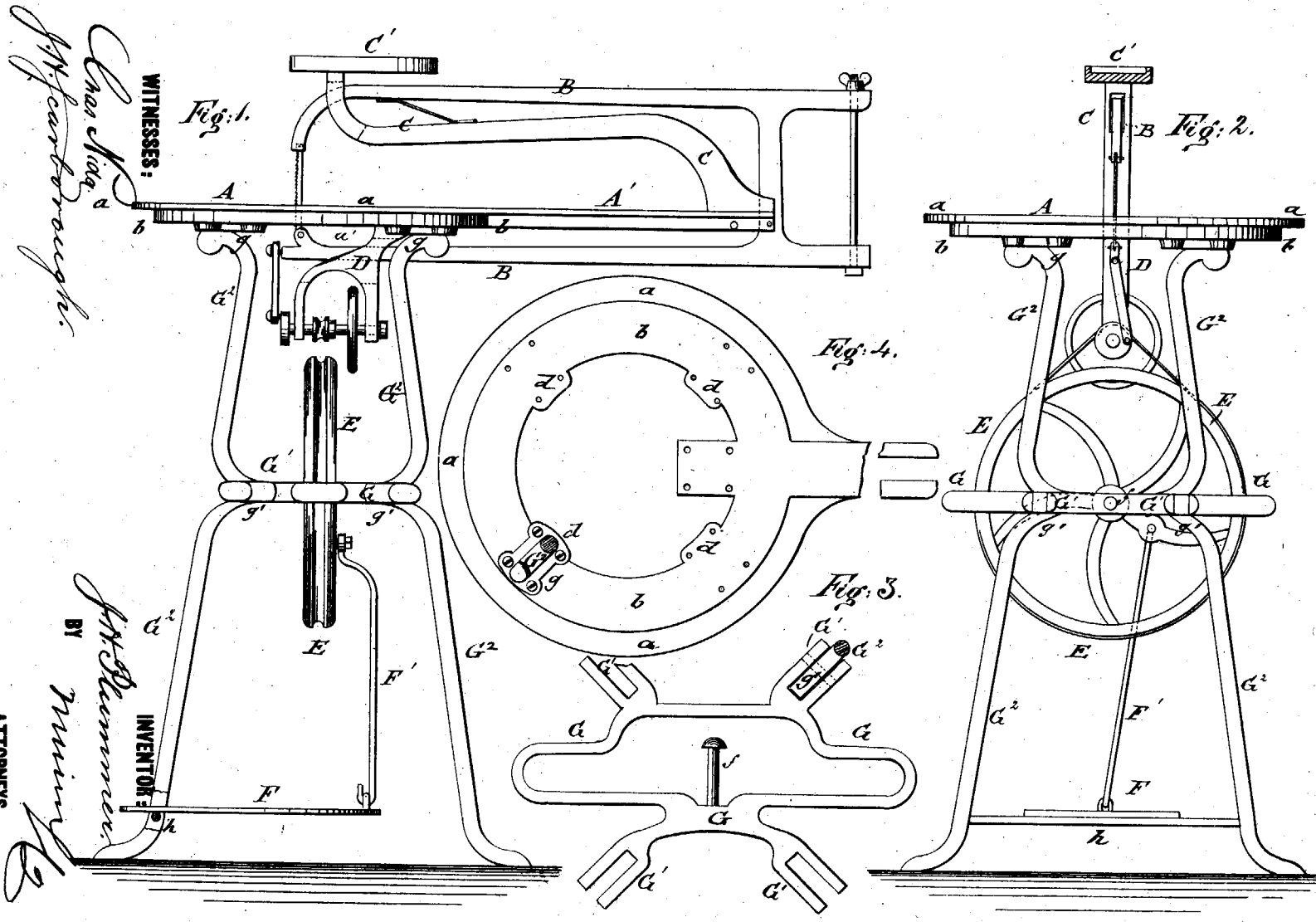
WITNESSES:
Chas. Nida.
J. H. Scarborough.
INVENTOR:
J. H. Plummer.
BY
Munn & Co
ATTORNEYS.
N. PETERS, PHOTO-LITHOGRAPHER, WASHINGTON, D. C.

UNITED STATES PATENT OFFICE.

JEROME H. PLUMMER, OF BROOKLYN, NEW YORK.

IMPROVEMENT IN SCROLL-SAWING MACHINES.

Specification forming part of Letters Patent No. 168,920, dated October 19, 1875; reissue No. 7,725, dated June 5, 1877; application filed April 16, 1877.

DIVISION A.

*To all whom it may concern:*

Be it known that I, JEROME H. PLUMMER, of Brooklyn, in the county of Kings and State of New York, have invented a new and Improved Stand for Scroll-Sawing Machines, of which the following is a specification:

In the accompanying drawing, Figure 1 represents a side elevation, and Fig. 2 a front elevation, of my improved stand and scroll-saw; and Figs. 3 and 4 are, respectively, a detail top view of the leg-connecting frame and a bottom view of the table.

Similar letters of reference indicate corresponding parts.

The invention has reference to an improved stand for scroll-sawing machines, by which a compact connection of the legs and support for the saw-table and operating parts are obtained, together with the convenience of taking the stand to pieces for shipment and putting the same up for use.

The invention consists of a saw-table having raised strengthening or rib part at the under side, to which the top plates or heads of the supporting-legs are attached. The legs are connected by a horizontal frame, being extended between the legs for the balance-wheel supported thereon.

By reference to the drawing, A represents the table of my improved stand for scroll-sawing machines, which table is constructed of suitable shape and size, and with due regard to lightness and strength.

The table A may be arranged with a suitable extension-arm, A′, to which a reciprocating scroll-saw frame, B, top arm C, and shelf C′, and bottom arm D are attached. Any other construction of scroll-saw or any other machine may be used with my stand, as I do not confine myself to the one shown in the drawing.

The table A is formed of an upper or principal part, *a*, and a lower strengthening or rib part, *b*, that may be extended below the extension A′, if such is used. The parts *a* and *b* may be cast in one piece, or in two separate parts of the same or of different materials, and suitably connected to each other. In place of a simple rib part, a double rib may be arranged when it is desired to make the table as light as possible.

The strengthening or rib part *b* is provided at proper distances from the center of the table and from each other with extensions or seats *d*, to which the supporting-legs are attached. These extensions or seats *d* are made either level with the under side of the ribs *b* or else sunk in for a depth equal to the flanged top parts or heads of the legs.

The balance-wheel E revolves on a stationary shaft, *f*, of a horizontal leg-connecting frame, G, that is extended at diametrically, opposite points around the wheel E, and provided with a suitable number of forked or recessed socket-arms, $G^1$, by which a set of table-supporting legs, $G^2$, is connected. The connecting-frame G serves thus the double purpose of providing a support for the balance-wheel and as a strong and rigid connection of the legs.

The shaft *f* of the balance-wheel is secured in any suitable manner to the frame G.

The legs $G^2$, of suitable form and size, are screwed by their flanged top-plates or heads *g′* to the corresponding extensions or seats *d* of the bottom rib part of the table A.

The legs $G^2$ are provided at suitable height with inwardly-projecting lugs *g* that are reduced in width at the sides to fit into the forked or recessed socket-arms $G^1$ of the wheel-frame G, thus interlocking therewith, and producing a firm and rigid support for, the table and suitable operating mechanism.

The leg-connecting frame G may be arranged for three or four legs, being provided with a corresponding number of socket-arms, $G^1$. The forked socket-arms $G^1$ and lugs *g* of the legs are bolted together, in any suitable manner, so as to admit the ready detaching or "knocking down" of the parts of the stand for shipment, and the convenient putting up of the same for use.

When the mechanism for which the stand is used is driven by foot-power, the front legs can be drilled at suitable height, to receive the straight or curved ends of a connecting-rod, *h*, serving as rest for a treadle, F, that is suitably hinged to it and pivoted at its rear to a crank-rod, F′, connected with the balance-wheel E.

A compact and rigid stand is thus furnished for the operating parts of scroll-saws, sewingmachines, and for other purposes, that admits the more convenient storing and shipping, and the ready setting up when required for use.

Having thus described my invention, I claim as new and desire to secure by Letters Patent—

1. The table A, having rib part *b*, seats *d*, and supporting-legs $G^2$, the latter having lugs and flanged heads, in combination with the connecting-frame having forked socket-arms $G^1$, as and for the purpose specified.

2. The leg-connecting frame G, having forked socket-arms for legs, curved diametrical extensions, and fixed lateral shafts for balance-wheel, substantially as set forth.

JEROME H. PLUMMER.

Witnesses:

PAUL GOEPEL,

C. SEDGWICK.